US005687573A

United States Patent [19]
Shih

[11] Patent Number: 5,687,573
[45] Date of Patent: Nov. 18, 1997

[54] THERMAL CONTROL DEVICE FOR COOLING OR HEATING PARKED VEHICLES

[76] Inventor: Ping-Ho Shih, 1416 S. 9th St., Alhambra, Calif. 91803

[21] Appl. No.: 656,767

[22] Filed: Jun. 6, 1996

[51] Int. Cl.$^6$ .................................................. F25B 21/02
[52] U.S. Cl. .................... 62/3.6; 62/244; 62/262; 62/3.7
[58] Field of Search ................. 62/3.2, 3.3, 3.6, 62/3.7, 244, 237, 262, 263, 404, 407, 410

[56] References Cited

U.S. PATENT DOCUMENTS

| 2,717,773 | 9/1955 | Gregg | 62/244 |
| 2,922,293 | 1/1960 | Peix | 62/244 |

*Primary Examiner*—John M. Sollecito
*Attorney, Agent, or Firm*—Albert O. Cota

[57] ABSTRACT

A thermal control device (10) for cooling or heating the passenger compartment of parked vehicles or a vehicle seat cushion (140). The device consists of a door frame/window interfacing fixture (12) that is attached between a vehicle door frame (200) and the vehicle's side window (202). The fixture includes an air exhaust sleeve (20) into which is inserted an air exhaust port (44) located on a device housing (30). The housing (30) also includes an air outlet port (58) that vents into the passenger compartment and incorporates a d-c motor (68), a centrifugal fan (70), a voltage polarity switch (71) and a temperature control module (72) which consists of a first and second heat exchanger (74,82) and a Peltier-effect thermoelectric element (90). Electrical power is supplied by a device control unit (108) that is programmed to apply electrical power from the vehicle battery (206) at a pro-selected time. When power is applied, the motor (68) rotates the fan (70) which allows either cool air or warm air as selected by the switch (71), to pass through the heat exchangers (74,82). In the summer or when cool air is preferred, the warm air is directed to the outside of the vehicle through the air exhaust port (44) and the cool air is directed through the air outlet port (58) into the vehicle passenger compartment or the seat cushion (140). In the winter cold air is directed outside the vehicle and the warm air is directed into the passenger compartment.

20 Claims, 4 Drawing Sheets

THERMAL CONTROL DEVICE FOR COOLING OR HEATING PARKED VEHICLES

TECHNICAL FIELD

The invention pertains to the general field of vehicle air conditioners and more particularly to a thermal control device that is specifically designed to be installed and utilized on parked vehicles to selectively cool or heat the passenger compartment of the vehicle.

BACKGROUND ART

The utility provided by air conditioners installed in vehicles is well established. Current air conditioners are specifically designed to be operated when the vehicle engine is on and are not intended for use when a vehicle is parked.

Except for indoor parking facilities, most vehicles are parked in an open lot under direct sunlight. Due to the green house effect, the temperature of the vehicle's passenger compartment can sometimes become very high. These hot temperature can cause deformation of plastic fixtures and other delicate materials which are located in the passenger compartment. A vehicle parked under the sun, even for a brief duration of time, often becomes too warm for the driver to immediately enter. Thus, the driver must wait outside of the vehicle until the inside temperature cools sufficiently. During winter, a similar situation occurs, cold temperatures can freeze windshields, agonize passengers and damage interior fixtures and other personal belongings.

When a long drive is required, the driver must usually sit in the same position for extended periods of time. During this time the vehicle seat can become warm or cold and uncomfortable. When this situation occurs, the disclosed invention allows the driver to attach the thermal control device to the seat cushion.

Many devices, such as blowers, sun shades, insulation, photovoltaic fans and miniature compressors have attempted to solve the green house effect problem, but none seem to work well or offer total satisfaction in both warm and cold environments. A search of the prior art did not disclose any patents that read directly on the claims of the instant invention. However, the following U.S. patents are considered related:

| PAT. NO. | INVENTOR | ISSUED |
|---|---|---|
| 4,955,203 | Sundbar | 11 September 1990 |
| 4,923,248 | Feher | 8 May 1990 |
| 4,453,503 | Freeburn | 12 June 1984 |

The U.S. Pat. No. 4,955,203 Sandbar patent discloses conditioning device for a parked automotive vehicle. The device includes a cooling unit consisting of a cooling chamber with at least one insulated wall having on opposite sides, a heat sink and a cooling block having therebetween a thermoelectric chip. The air conditioning device also includes an air intake conduit, a cool air conduit, an exhaust conduit and means for supplying power to the cooling unit.

The U.S. Pat. No. 4,923,248 Feher patent discloses a seat pad and backrest that encloses a plenum into which pressurized air is provided from an adjacent Peltier air temperature and humidity modifying apparatus. A metallic mesh is part of the seat pad and backrest and warms or cools the user by conduction. Alternatively, the seat pad and backrest can be separate to allow each to be provided with an air flow via a selectively adjustable proportioning valve.

The U.S. Pat. No. 4,453,503 Freeburn patent discloses a heat transfer device using a thermal-electric solid state heat pump coupled to a source of electrical energy. The pump transfers heat between the heat pump and a pair of heat exchangers. One of the heat exchangers defines a fluid flow path for the transfer of heat between that heat exchanger and heat pump. The other heat exchanger transfers heat between the heat pump and the ambient environment. The direction of heat transfer is determined by the polarity of the electrical power supplied to the heat pump.

For background purposes and as indictive of the art to which the invention relates, reference may be made to the following remaining patents found in the search:

| PAT. NO. | INVENTOR | ISSUED |
|---|---|---|
| 5,339,638 | Kessel | 23 August 1994 |
| 5,099,649 | Zorn | 31 March 1992 |
| 4,335,849 | van Bashaysen | 22 June 1982 |

DISCLOSURE OF THE INVENTION

The thermal control device disclosed herein is designed to provide the passenger compartment of a parked vehicle with cool or heated air. In its most basic design configuration, the thermal control device consists of:

a) A door frame/window interfacing fixture having means for being attached between a vehicle door frame and a corresponding vehicle window. The fixture includes an air exhaust sleeve that projects into the passenger compartment and that vents to the vehicle exterior.

b) A device housing having:
  (1) an air exhaust port that frictionally fits into the air exhaust sleeve on the door frame/window interfacing fixture,
  (2) an air outlet port,
  (3) a d-c motor that operates a fan,
  (4) a temperature control module that uses a Peltier-effect thermoelectric element that produces a hot or cold temperature,
  (5) a power/voltage-polarity selecting switch that controls the voltage applied to the d-c motor and the polarity of the voltage applied to the temperature control module. The hot or cold temperature produced by the temperature control module is dependent upon the applied voltage polarity. The selected temperature output from the temperature control module is forced out the outlet port of the device housing into the passenger compartment by the fan, and c) a device control unit attached to the device housing via a power cable, The device control unit has means for controlling the time that the voltage, derived from a voltage source, is to be applied to the device housing.

The temperature control module consists of a thermoelectric element that is sandwiched between two heat exchangers. The element utilizes the Peltier-effect in which the application of a d-c voltage difference creates displacement of the free electrons, and valence electrons from lower energy bands to higher energy bands. This displacement produces energy in the form of a hot, temperature from one side of the element and a cold temperature from the other side of the element.

The device control unit is preferably designed with an integral plug that is designed to be plugged into a vehicle cigarette-lighter receptacle. The receptacle provides the voltage source which in this case, consists of the vehicle battery. The housing also includes a keypad that controls the timing function, and a variable resistor that controls the voltage level which determines the fan speed which, in turn, determines the cooling and heating level that is applied to the vehicle's passenger compartment.

In view of the above disclosure, it is the primary object of the invention to provide a thermal control device that selectively cools or heats the passenger compartment of a parked vehicle.

In addition to the primary object it is also an object of the invention to provide a thermal control device that:

is easily installed with no hand tools required, is easily removed and stored when not in use.

is not affected by the speed of the vehicle engine, is energy efficient, has a high reliability and is easy to maintain, can be easily molded in a variety of colors, is cost effective from both a manufacturing and consumer points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment that discloses a thermal control device 10 that allows the passenger compartment of a parked vehicle or a vehicle seat cushion to be provided with either a cooling or heating air flow. The preferred embodiment, as shown in FIGS. 1–9, is comprised of the following major elements: a door frame/window interfacing fixture 12, a device housing 30 which incorporates a d-c motor 68, a centrifugal fan 70, a power/voltage polarity switch 71, and a temperature control module 72. The device housing 30 is controlled by a device control unit 108, that incorporates a power cable 112, a microprocessor 116, an LCD display 120, a timing circuit 122, a keypad 124 and a power relay 126.

Figure 1:
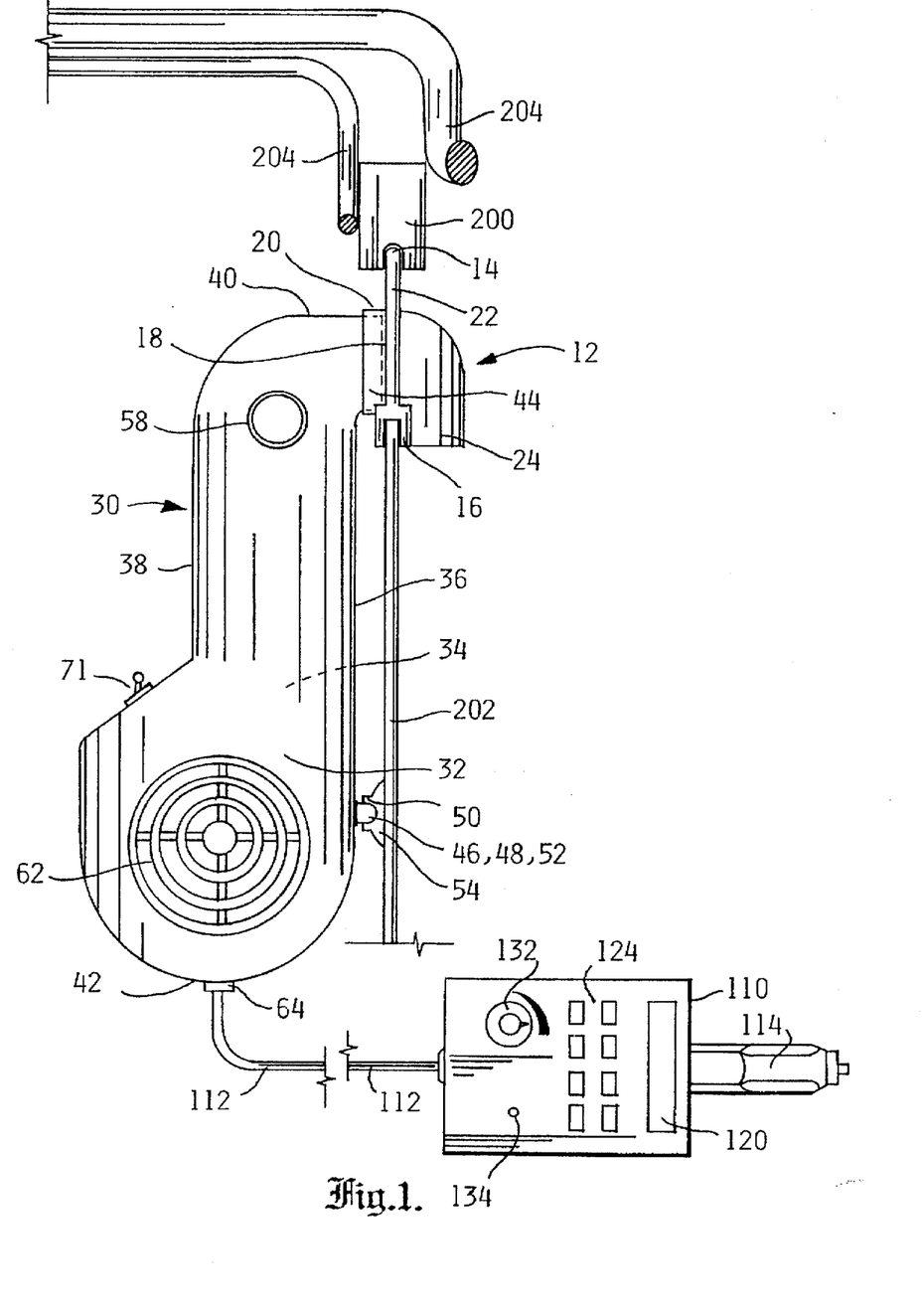
FIG. 1 is an elevational view of the thermal control device showing the device housing attached via a power cable to a device control unit and the entire thermal control device attached to a vehicle window by means of a door frame/ window interfacing fixture.
Figure 2:
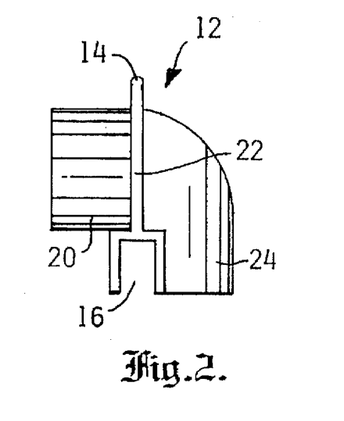
FIG. 2 is a side elevational view of the door frame/ window interfacing fixture.
Figure 3:
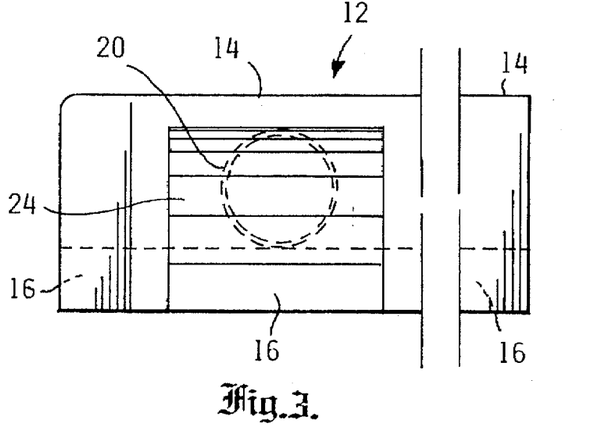
FIG. 3 is a front elevational view of the door frame/ window interfacing fixture.

The thermal control device 10 is designed to be attached between a vehicle door frame 200 and a corresponding vehicle window 202. The attachment is made by utilizing a door frame/window interfacing fixture 12 as shown attached in FIG. 1 and separated in FIGS. 2 and 3. The fixture 12 includes an upper closed edge 14 and a lower bifurcated edge 16. The upper closed edge 14 is dimensioned to fit into the vehicle door frame 200 and the bifurcated edge 16 is dimensioned to fit over the edge of the vehicle window 202 as shown in FIG. 1. The fixture 12 further includes an inward side 18 and an outward side 22. The inward side 18 has an air exhaust sleeve 20 and the outward side 22 has an air deflector 24 that is in alignment with the air exhaust sleeve 20.

Figure 4:
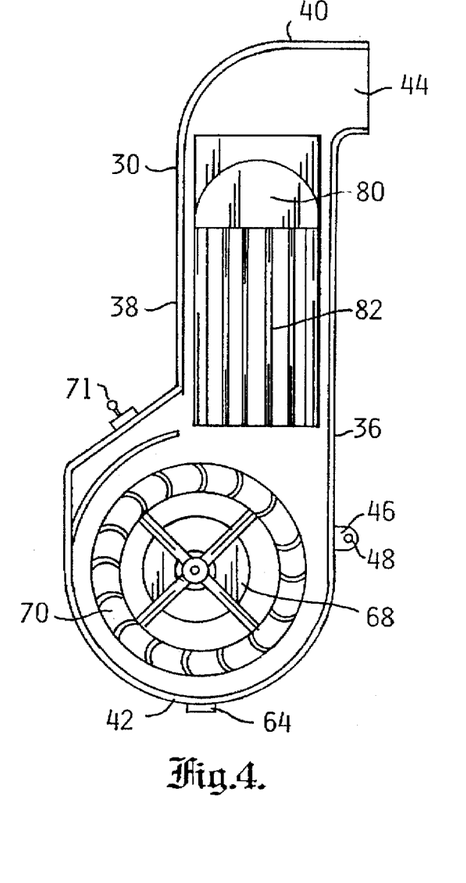
FIG. 4 is an elevational view of the second side of the device housing showing the relative locations of the temperature control module, the d-c motor, the centrifugal fan and the voltage-polarity selecting switch.
Figure 5:
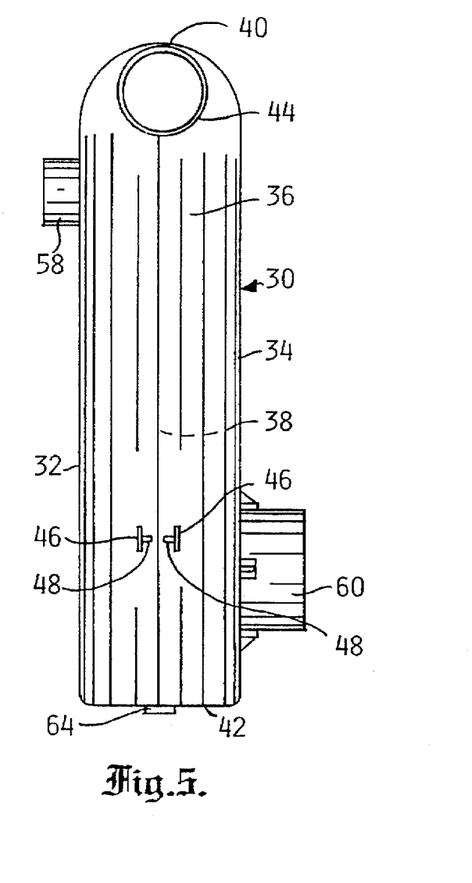
FIG. 5 is an elevational view of the outward side of the device housing.
Figure 6:
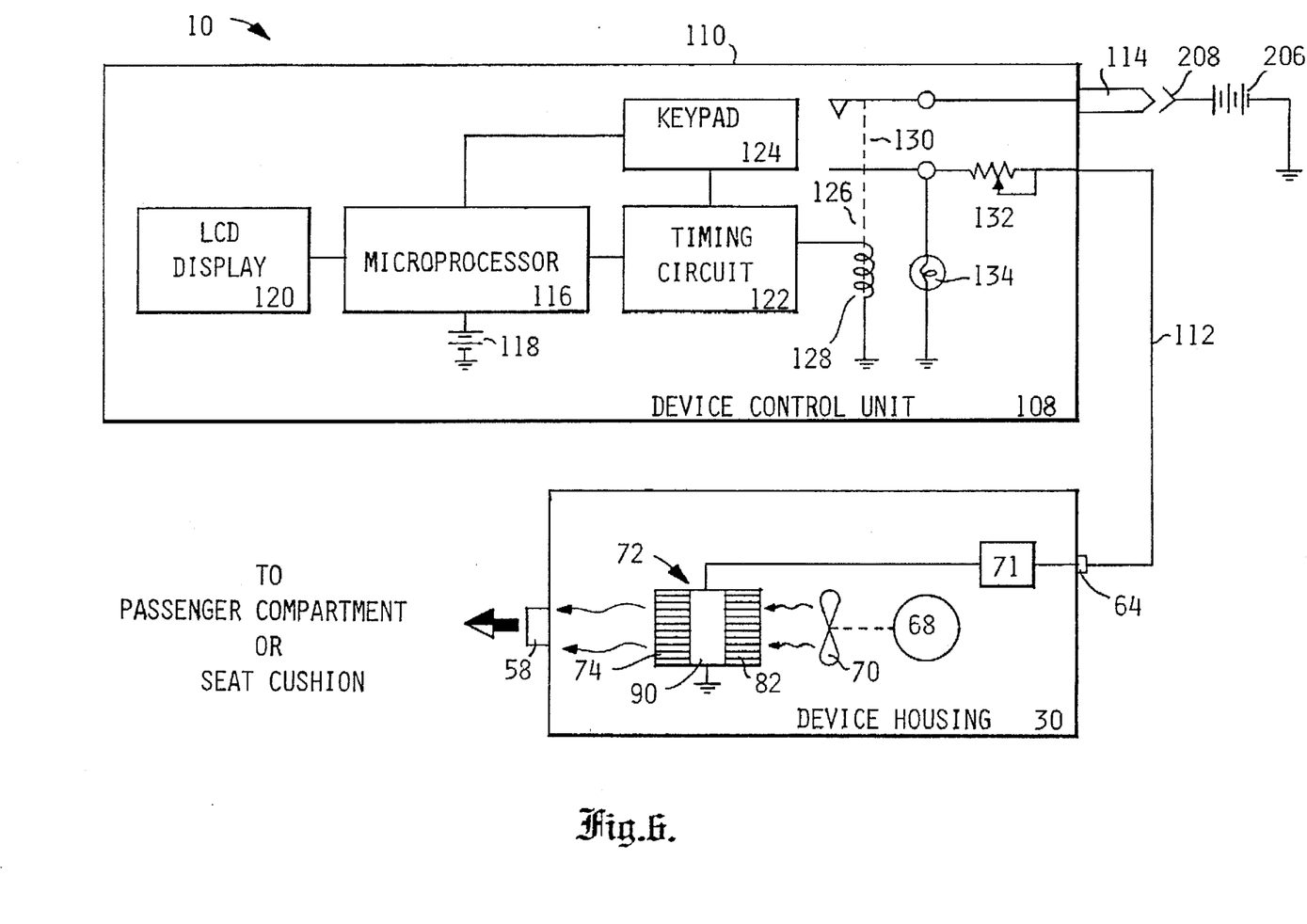
FIG. 6 is a combination block diagram and schematic of the device housing and the device control unit.

The device housing 20 as shown structurally in FIGS. 1, 4 and 5 and schematically in FIG. 6 consists of a first side 32, a second side 34, an outward side 36, an inward side 38, an upper side 40 and a lower side 42. Along the upper side 40 extends an air exhaust port 44 that projects outward from the outward side 36. The port 44 is dimensioned to be frictionally inserted into the air exhaust sleeve 20 located on the fixture 12 as shown in FIG. 1. When so inserted, the device housing 30 is secured in its functional position within the vehicle passenger compartment. To provide an additional device housing attachment point, the housing 30 includes on its outward side 36 a window attachment means preferably consisting of a pair of protrusions 46 having inward extending pins 48 as shown in FIGS. 1, 4 and 5. Into these pins 48 is attached a block 50 having a pair of pin bores 52. To the outward side of the block is attached a suction cup 54. The cup 54 is vertically articulated to allow the cup to be attached to vehicle window 202 having an angled surface.

The device housing 20 also includes an air outlet port 58 that projects outward from the first side 32, as best shown in FIGS. 1 and 5; a motor cavity 60 located near the lower side 42 and that projects outward from the second side 34 as also shown best in FIG. 5; a fan vent 62 located on the first side 32 opposite the motor cavity 60 as shown in FIG. 1; and a cable inlet port 64 located on the lower side 42 as shown in FIG. 4.

Within the confines of the device housing 30, as shown in FIG. 4 and 6, is the d-c motor 68 that is attached within the motor cavity 60; a centrifugal fan 70 that is operated via the shaft of the motor 68; a temperature control module 72, and along the inward side 38 of the housing 30 is located a power/voltage-polarity selecting switch 71. In the preferred embodiment, the switch 74 includes a first position, a center position and a second position. When the switch is placed in the center position, no power is applied to the device housing 30; when placed in the first position, the output of the temperature control module 72 is cool, when placed in the second position, the module 72 produces a heated output.

Figure 7:
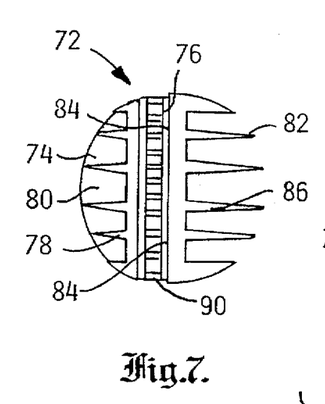
FIG. 7 is a top plan view of an assembled temperature control module.
Figure 8:
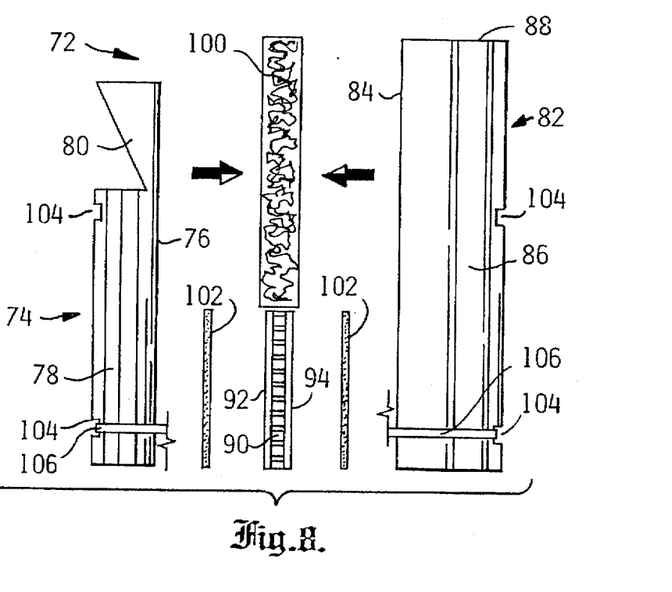
FIG. 8 is an exploded elevational view of the temperature control module.

The temperature control module 72 is shown located within the second side 34 of the device housing 30 in FIG. 4, assembled in FIG. 7 and in an exploded view in FIG. 8.

The module 72 is comprised of a first heat exchanger 74, a second heat exchanger 82 and a Peltier-effect thermoelectric element 90.

The first heat exchanger 74 has a substantially flat inward area 76 and an outward area comprising a lower longitudinally finned area 78 and an integral upper baffle 80. As shown best in FIG. 8, the baffle 80 slopes outward, wherein when the first heat exchanger 74 is placed into the device housing 30 as shown in FIG. 4, the baffle 80 substantially surrounds the air outlet port 58. This placement allows the air flow (as described infra) to be directed into and out the air outlet port 58.

The second heat exchanger 82 also has a substantially flat inward area 84 and an outward, longitudinally finned area 86. The finned area 86 extends along the entire length of the second heat exchanger 82, as shown in FIG. 8, with an upper edge 88 that terminates adjacent the air exhaust port 44 as shown in FIG. 4.

The first and second heat exchangers 74, 82 are made of a high-conduction metal, such as aluminum. They are also designed to have a lateral fin contour to accommodate the internal contoured surface of the device housing 30. This shape provides maximum efficiency by facilitating the dispersion of the air flow through the finned area.

Sandwiched between the substantially flat inward areas of the two heat exchangers 74, 82, as shown in FIGS. 7 and 8, is a Peltier-effect thermoelectric element 90. The element 90 is comprised of a serial or parallel arrangement of P-N type Peltier-effect thermoelectric bi plurimetallic alloy plates which can consist of a Bi-Te-Se-Sb alloy, The element has a first side 92 and second side 94 wherein either side can provide either a cool or hot temperature dependent upon the polarity of the applied voltage as controlled by the polarity control switch 71. In this design, the side of the element 90 that interfaces with the first heat exchanger 74 is selected to produce either the cool or hot temperature that is to be ultimately applied to the passenger compartment of the vehicle.

To insure that the temperature control module 72 is operating at its maximum efficiency, an insulation gasket 100 and a surface contact gel or paste 102 is employed. As shown in FIGS. 7 and 8, the gasket 100 is located between the interfacing flat inward areas 76, 84 of the first and second heat exchangers 74, 82. Likewise, the paste 102 is applied between the flat inward areas 76,84 that interface with the first and second sides 92,94 of the thermoelectric element 90. As a further safeguard to securing the temperature control module and to achieve a maximum transfer of cool and hot air, the two finned areas include a pair of band notches 104. Into these notches is wrapped and tightened, by a tightening means, a clamping band 106, as shown in FIG. 8, that maintains the two finned areas of the temperature control module 72 in place.

The electrical power to operate the device housing 30 is supplied through the device control unit 108. Broadly described, the unit 108 has means for supplying the device housing 30 with a selectable d-c voltage that is applied to the housing through a power cable 112 connected to the power cable input port 64 as shown in FIGS. 1 and 6. The d-c voltage operates the d-c motor 68 and the temperature control module 72. The module 72 produces a selected temperature output that either heats of cools depending on the polarity of the applied voltage as selected by the voltage polarity selecting switch 71. When the d-c motor 68 operates, it rotates the centrifugal fan 70 which produces an air flow containing the selected output of the temperature control module 72. The air flow is vented through the air outlet port 58 into the interior of the vehicle or to a seat cushion 138 as described infra. The non-selected output of the temperature control module 72 is vented out the vehicle exterior through the aid exhaust port 44 and the air deflector 24 located on the door frame/window interfacing fixture 12.

More specifically, the device control unit 108 as shown in a plan view in FIG. 1 and in a combination schematic/block diagram in FIG. 6, is comprised of eleven major elements, a housing 110, a power cable 112, a power plug 114, a microprocessor 116 or the like, a lithium battery 118, a liquid crystal display (LED) 120, a timing circuit 122, a keypad 124 a power relay 126 having a coil 128 and contacts 130, a variable resistor 132 and a power-on indicator 134. The power plug 114 is an integral part of the housing 110 as shown in FIG. 1. The plug 114 is designed to be inserted into a vehicle cigarette-lighter receptacle 208 from where the 12-volts d-c from the vehicle battery 206 is made available to the device control unit 108.

The unit 108 is controlled by the microprocessor 116 which is powered by an internal power source such as a 1.5 volt d-c lithium battery 118 as shown in FIG. 6 has a program means. The microprocessor includes a program means for enabling and operating, through the keypad 124, the LCD display 120 and the timing circuit 122.

The LCD display 120 indicates the time of day, the days of the week, and the status of the timing circuit 122. The circuit 122 can be operated in a manual mode or in an automatic mode when controlled by the microprocessor 116. The circuit 122 is set by depressing the proper button on the keypad 124. The keypad 124 as shown in FIG. 1, includes eight pushbuttons which activate the week (WK), hours (HR), minutes (MIN), a reset/recall (RST/RCD), clock (CDK), time (TM), ON/AUTO/OFF, and sleep/count (SLP/CNT).

To operate the thermal control device 10, the keypad 124 is set to activate the timing circuit 122 at a particular time. When the preset time is reached, the circuit 122 in combination with the microprocessor 116 is enabled, allowing a voltage to be produced that energizes the power relay 126. The energized power relay 126 closes the relay contacts 130 allowing the 12-volt d-c voltage present at the plug 114 to be applied through the series connected variable resistor 132 via the power cable 112, to the device housing 30. The variable resistor 132 can be adjusted from 4-volts d-c to 12-volts d-c to provide a voltage level to regulate the outputs of both the temperature control module 72 and the speed (RPM) of the motor 68 which in turn controls the speed of the centrifugal fan 70. The device control unit 108 also includes a power-on indicator 134 that when illuminates indicates that power is being applied to the housing device 30. The indicator 134 may consist of a light emitting diode (LED) or an incandescent lamp.

The primary utility of the thermal control device 10 is to cool the passenger compartment of a parked vehicle during high temperature periods or heat the vehicle passenger compartment during cold periods. However, the thermal control device 10 can also be used in combination with a seat cushion 140. The seat cushion, as shown in FIG. 7, includes a resilient, side band 142. The band includes a lower edge 144, an upper edge 146 and an air inlet port 148 that projects outward from one side of the band, Around the lower edge 144 of the side band 142 is attached, by an attachment means, a lower section 150 and likewise attached to the upper edge 146 is attached an upper section 152.

Figure 9:
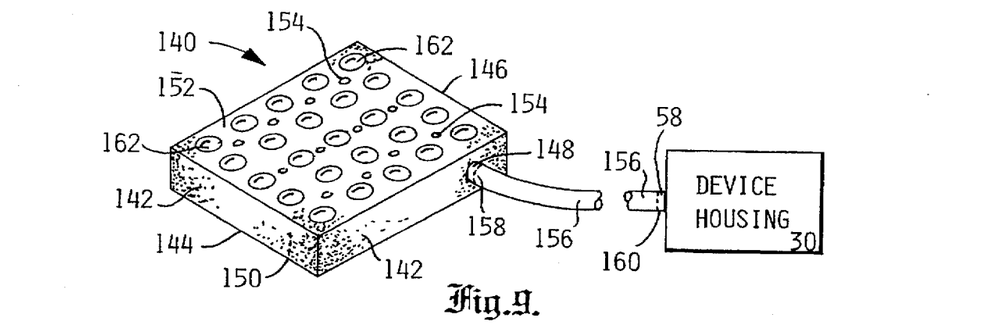
FIG. 9 is a perspective view of a seat cushion attached to the air outlet port of the device housing by means of a flexible hose.

The upper section as shown in FIG. 9, includes a multiplicity of air vent bores 154 distributed throughout the area of the upper section 152. The seat cushion is used in combination with a flexible hose 156 having a first end 158 and a second end 160. The hose, as also shown in FIG. 9 is preferably constructed of corrugated light plastic that can be easily cut to a length that accommodates the specific location of the seat cushion 140. The first end 158 of the hose is dimensioned to frictionally fit into the air outlet port 58 located on the device housing 30.

The second end 160 of the hose is dimensioned to frictionally fit into the air inlet port 148 on the side band 142 of the cushion 140. Thus, when cool or hot air is applied through the air outlet port 58, the air is distributed to a person sitting on the seat cushion 140 through the multiplicity of air vent bores 154.

To further add to the utility of the seat cushion 140, the upper section 152 is further includes of a multiplicity of outward projections 162 preferably in an oval shape as shown in FIG. 9. The projections 162 perform two functions: they massage the cushion user and provide void spaces for ventilating and distributing the air flow.

Figure 10:
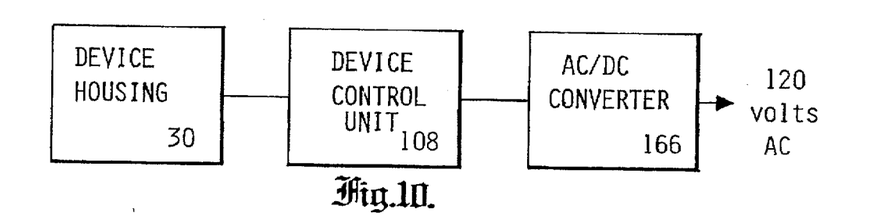
FIG. 10 is a block diagram of a device control unit that is applied power by an a-c/d-c adapter connected to 120-volts a-c.
Figure 11:
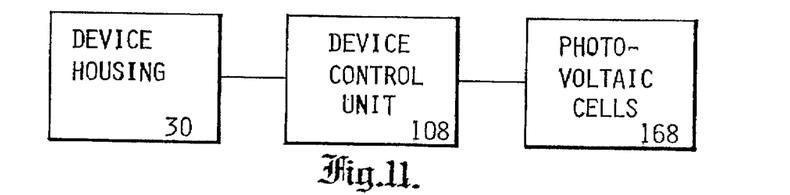
FIG. 11 is a block diagram of a device control unit that is applied power by a plurality of series-parallel connected photovoltaic cells.

While the invention has been described in complete detail and pictorially shown in the accompanying drawings it is not to be limited to such details, since many changes and modifications may be made in the invention without departing from the spirit and scope thereof. For example, the power applied to the device control unit 108 can be supplied by an ac/dc adapter 166 having an input connected to a 120 volt a-c power source as shown in FIG. 10. Alternatively, a plurality of series-parallel connected photovoltaic cells 168 can be used to directly power the device control unit as shown in FIG. 1. The cells 168 can also be used to recharge the vehicle battery 206 by a circuit well known in the prior art and therefore not disclosed. Hence, the invention is described to cover any and all modifications and forms which may come within the language and scope of the appended claims.

I claim:

1. A thermal control device for cooling or heating parked vehicles, said device comprising:
   a) a door frame/window interfacing fixture having means for being attached between a vehicle door frame and a corresponding vehicle window, with said fixture further having an air exhaust sleeve that projects into the passenger compartment and vents to the vehicle exterior,
   b) a device housing having:
      (1) an air exhaust port that frictionally fits into the air exhaust sleeve on said fixture,
      (2) an air outlet port,
      (3) a d-c motor that operates a fan,
      (4) a temperature control module that uses a Peltier-effect thermoelectric element that produces a hot or cold temperature,
      (5) a power/voltage-polarity selecting switch that controls the voltage applied to said d-c motor and the polarity of the voltage applied to said temperature control module, wherein the hot or cold temperature produced by said temperature controlled module is dependent upon the applied voltage polarity, wherein the selected temperature output from said temperature control module is forced out the outlet port of said device housing into the passenger compartment by said fan, and
   c) a device control unit attached to said device housing, via a power cable, wherein said unit having means for controlling the time that the voltage, derived from a voltage source, is to be applied to said device housing.

2. A thermal control device for cooling or heating parked vehicles, said device comprising:
   a) a door frame/window interfacing fixture having:
      (1) an upper closed edge dimensioned to fit into a vehicle door frame,
      (2) a lower bifurcated edge dimensioned to fit over the edge of a corresponding vehicle window,
      (3) an inward side having an air exhaust sleeve, and
      (4) an outward side having an air deflector in alignment with the air exhaust sleeve,
   b) a device housing having ,a first side, a second side, an outward side, an inward side, an upper side and a lower side, said housing further having:
      (1) an air exhaust port that extends along the upper side and projects outward from the outward side, wherein said exhaust port is dimensioned to be frictionally inserted into the air exhaust sleeve on said fixture, wherein when inserted, said housing is secured in its functional position within the passenger compartment of the vehicle,
      (2) an air outlet port that projects outward from the first side,
      (3) a motor cavity located near lower side and projecting outward from the second side,
      (4) a fan vent located on the first side opposite the motor cavity,
      (5) a power cable input port located on the lower side,
      (6) a d-c motor attached within the motor cavity,
      (7) a centrifugal fan attached to and operated by said motor,
      (8) a temperature control module located within said device housing,
      (9) a power/voltage-polarity selecting switch located on the inward side, and
   c) a device control unit having means for supplying said device housing with an adjustable d-c voltage level that is applied to said housing through a power cable connected to the power cable input port, wherein said d-c voltage operates said motor and said temperature control module, wherein said module has means for producing a selected temperature output that either heats or cools depending on the polarity of the applied voltage as selected by said power/voltage-polarity selecting switch, wherein when said d-c motor operates, it rotates said centrifugal fan which produces an air flow containing the selected output of said temperature control module which is vented through the air outlet port into the passenger compartment of the vehicle, and wherein the non-selected output of said temperature control module is vented out the passenger compartment through the air exhaust port.

3. The thermal control device as specified in claim 2 further comprising a window adapter having a lower bifurcated edge dimensioned to fit over the edge of a vehicle window, and an upper edge dimensioned to fit into the bifurcated edge of said door frame/window interfacing fixture.

4. The thermal control device as specified in claim 2 wherein said temperature control module comprises:
   a) a first heat exchanger having a substantially flat inward area and an outward area comprising a lower longitudinally finned area and an internal upper baffle that slopes outward, wherein when said first heat exchanger is placed into said device housing the baffle substantially surrounds the air outlet port allowing the air flow to be directed into and out the air outlet port,
   b) a second heat exchanger having a substantially flat inward area and an outward, longitudinally finned area having an upper edge that terminates adjacent the air exhaust port, and c) a Peltier-effect thermoelectric element sandwiched between the substantially flat inward areas of said first and second heat exchangers, wherein said element has a first side and a second side wherein either side can be made to produce a cool or hot temperature dependent upon the polarity of the applied voltage as controlled by said power/voltage-polarity switch, wherein the side of said element that interfaces with the first heat exchanger is selected to produce either a cool or hot temperature by selecting the polarity of the applied voltage as controlled by said voltage polarity selecting switch.

5. The thermal control device as specified in claim 4 wherein said temperature control module further comprises:

a) an insulation gasket located between the interfacing flat inward areas of said first and second heat exchangers, and b) a surface contact paste applied between the flat inward areas of said first and second heat exchangers that interface with the first and second sides of said thermoelectric element.

6. The thermal control device as specified in claim 4 further comprises at least one clamping band attached laterally around said first and second heat exchangers, wherein said band secures said temperature control module.

7. The thermal control device as specified in claim 4 wherein the finned area of said first and second heat exchangers are laterally contoured to accommodate the internal contoured surface of said device housing.

8. The thermal control device as specified in claim 4 wherein said thermoelectric element is comprised of a series or parallel arrangement of P-N type Peltier-effect thermoelectric bi or plurimetallic alloy plates.

9. The thermal control device as specified in claim 8 wherein said alloy plates comprise a Bi-Te-Se-Sb alloy.

10. The thermal control device as specified in claim 2 wherein said device control unit further comprises a microprocessor having program means for enabling and operating through a keypad, a liquid crystal diode (LCD) display and a timing circuit, whereupon at a preselected time, as set into the keypad, the timing circuit energizes a relay, which then allows the vehicle battery voltage to be applied, via said power cable, into said device housing.

11. The thermal control device as specified in claim 10 wherein said keypad consists of at least eight function keys that when selectively depressed select the week (WK), hours (HR) and minute (MN) that said thermal control device is to be enabled, wherein said keypad also includes keys for selecting a reset/recall (RST/RCL), a clock (CLK), a time (TM), an ON/AUTO/OFF and a sleep/count (SLP/ONT), wherein the function selected is displayed on said LCD display.

12. The thermal control device as specified in claim 10 wherein said device control unit further comprises:

a) a variable resistor located in series with said power cable, wherein said resistor can be adjusted to produce an output ranging from 4 volts d-c to 12 volts d-c that allows the temperature of said cooling and heating module and the speed of said centrifugal fan to be regulated, and b) a power on indicator that illuminates when power is being applied to said device housing.

13. The thermal control device as specified in claim 10 wherein said device control unit further comprise a power plug designed to fit into a vehicle cigarette-lighter receptacle from where the vehicle battery voltage is applied.

14. The thermal control device as specified in claim 2 wherein the outward side of said device housing further comprises a window attachment means consisting of a vertically articulated suction cup.

15. The thermal control device as specified in claim 2 further comprising a seat cushion having:

a) a resilient closed side band that includes a lower edge, an upper edge and an air inlet port that projects outward from one side of the band, b) a lower section attached to the lower edge of said band, c) an upper section attached to the upper edge of said band, with said upper section having a multiplicity of distributed air vent bores, and d) a flexible hose having a first end that is dimensioned to frictionally fit into the air outlet port on said device housing and a second end dimensioned to frictionally fit into the air inlet port on said cushion, wherein the cool or hot air is applied to a person sitting on said cushion through the multiplicity of the distributed air vent bores.

16. The thermal control device as specified in claim 15 wherein the upper section of said cushion further comprises a multiplicity of outward projections dispersed between the air vent bores, wherein said projections massage the cushion user and provide void spaces for ventilating the air flow.

17. The thermal control device as specified in claim 2 wherein the d-c voltage applied to said device control unit is provided by an ac/dc adapter having an input connected to a 120-volt a-c power source.

18. The thermal control device as specified in claim 2 wherein the d-c voltage applied to said device control unit is provided by a plurality of series-parallel connected photovoltaic cells.

19. A thermal control device for use on parked vehicles, said device comprising:

a) a door frame/window interfacing fixture having:
   (1) an upper closed edge dimensioned to fit into a vehicle door frame,
   (2) a lower bifurcated edge dimensioned to fit over the edge of a corresponding vehicle window,
   (3) an inward side having an air exhaust sleeve, and
   (4) an outward side having an air deflector in alignment with the air exhaust sleeve, b) a device housing having a first side, a second side, an outward side, an inward side, an upper side and a lower side, said housing further having:
   (1) an air exhaust port that extends along the upper side and projects outward from the outward side, wherein said exhaust port is dimensioned to be frictionally inserted into the air exhaust sleeve on said fixture, wherein when inserted, said housing is secured in its functional position within the passenger compartment of the vehicle,
   (2) an air outlet port that projects outward from the first side,
   (3) a motor cavity located near the lower side and projecting outward from the second side,
   (4) a fan vent located on the first side opposite the motor cavity,
   (5) a power cable input port located on the lower side, c) a d-c motor attached, within the motor cavity, d) a centrifugal fan attached to and operated by said motor, e) a temperature control module located within said device housing, f) a power/voltage-polarity selecting switch located on the inward side, g) a device control unit having means for supplying said device housing with a adjustable d-c voltage level that is applied to said housing through a power cable connected to the power cable input port, wherein said d-c voltage operates said motor and said temperature control module, wherein said module has means for producing a selected temperature output that either heats or cools depending on the polarity of the applied voltage as selected by said voltage polarity selecting switch, wherein when said d-c motor operates, it rotates said centrifugal fan which produces an air flow containing the selected output of said temperature control module which is vented through the air outlet port into the passenger compartment of the vehicle, and wherein the non-selected output of said temperature control module is vented out the passenger compartment through the air exhaust port, and h) wherein the cool or hot air being vented through the air outlet port is applied to the interior of a vehicle or to a set cushion, wherein said seat cushion comprises:

(1) a resilient side band that includes a lower edge, an upper edge add an air inlet port that projects outward from one side of the band, (2) a lower section attached to the lower edge of said band, (3) an upper section attached to the upper edge of said band, with said upper section having a multiplicity of distributed air vent bores, and (4) a flexible hose having a first end that is dimensioned to frictionally fit into the air outlet port on said device housing and a second end dimensioned to frictionally fit into the air inlet port on said cushion, wherein the cool or hot air is applied to a person sitting on said cushion through the multiplicity of the distributed air vent bores.

20. The thermal control device as specified in claim 19 wherein the upper section of said cushion further comprises a multiplicity of outward projections dispersed between the air vent bores, wherein said projections massage the cushion user and provide void spaces for ventilating the air flow.

* * * * *